Patented Feb. 9, 1937

2,070,056

UNITED STATES PATENT OFFICE 2,070,056

EXTERMINATOR AND METHOD FOR PREPARING THE SAME

Vincent Losito, Avondale, Pa.

No Drawing. Application November 30, 1935,
Serial No. 52,341

3 Claims. (Cl. 47—1)

This invention relates to a novel method of treating mushroom beds as well as a novel composition of matter for exterminating or rendering ineffective the plant and/or animal life which are deleterious agents during mushroom cultivation and also a new method for preparing the same.

In the art of mushroom cultivation it has been common to employ beds or tiers on which are located a layer of soil and a layer of fresh manure. These tiers are located in an especially built mushroom house, and the interior thereof may be heated by both artificial means and by manure decomposition. Mushroom spawn are spread over said layers when the temperature of the same and that of the atmosphere of the house has reached the desired elevation. Because of the relatively high temperature necessary during the spawn application and development of the spawn into mushrooms, there are produced a large quantity of sucking and breathing insects. These insects and the larvae from which they are derived have been deleterious agents in the cultivation of mushrooms. In the course of mushroom cultivation it is not uncommon for these agents to attack either or both the spawn and the mushrooms during growth so that the yield of mushrooms is considerably reduced and in some cases is so low that the crop is abandoned.

It is in order to increase the yield of mushrooms that the invention has been made. For this purpose, I have provided a new type of exterminator which has no deleterious effect on either the spawn or mushrooms while in growth, and in addition will reduce if not substantially totally prevent the existence of said deleterious agents during mushroom cultivation.

An object of my invention is to provide a novel method of treating a mushroom house.

A further object of my invention is to provide a novel type of composition of matter for exterminating the deleterious animal life which heretofore have caused low mushroom yields during cultivation.

A still further object of my invention is to provide a novel method for preparing my mushroom protecting substance.

These and other objects of my invention will be apparent from the following description.

According to my invention the spawn and mushrooms are protected against aphids, termites, springtails and other deleterious animal life by subjecting them to a novel type of extermination. For this purpose I provide an exterminator which comprises, calcium oxide, magnesium oxide, nicotine and water. The amount of each ingredient depends upon whether the resultant composition is to be sprayed in the atmosphere of the mushroom house or spread upon the tiers or housewalks. Two compositions, hereinafter identified as Dust A and Dust B have been found to be particularly efficacious for my purposes.

Dust A

| | Pounds |
|---|---|
| Hydrate of lime | 45 |
| Ground burned lime | 14 |
| Nicotine containing composition A | 8 |

Dust B

| | Pounds |
|---|---|
| Hydrate of lime | 100 |
| Ground burned lime | 10 |
| Nicotine containing composition B | 12.5 |

The hydrate of lime in both Dust A and Dust B has the following composition:

| | Per cent |
|---|---|
| Silicia and insolubles | 1.89 |
| Iron and alumina | 0.83 |
| Calcium oxide total | 47.93 |
| Magnesium oxide total | 32.75 |
| Carbon dioxide | 0.70 |
| Uncombined water | 0.31 |
| Combined water | 15.35 |
| Fineness pass #30 | 99.9 |
| Fineness pass #100 | 97.3 |
| Fineness pass #200 | 93.8 |

The ground burned lime in both Dust A and Dust B has the following composition:

| | Per cent |
|---|---|
| Silica and insolubles | 2.12 |
| Iron and alumina | 0.89 |
| Calcium oxide total | 55.76 |
| Magnesium oxide total | 37.95 |
| Carbon dioxide | 0.74 |
| Water | 2.64 |

This is finely pulverized quicklime.

The nicotine containing composition A contained in Dust A contains 50% free nicotine carried by an inert substance which may be in liquid or solid form.

The nicotine containing composition B contained in Dust B contains 40% nicotine sulphate carried by an inert substance which may be in liquid or solid form.

I prepare my novel Dusts A and B by following a novel procedure which comprises the following steps:

*For the preparation of Dust A*

Forty-five pounds of said hydrate of lime is spread on a table and to this is added fourteen pounds of said fine ground burned lime. These two ingredients are stirred until an intimate and uniform admixture is formed. Said nicotine composition A is added to this admixture and the entire mass is stirred for providing a fairly uniform distribution of said composition through said limes. Immediately thereafter the admixture is packed in air tight drums and is ready for distribution and use.

*For the preparation of Dust B*

One hundred pounds of said hydrate of lime is spread on a table. To this is added ten pounds of said ground burned lime. These two limes are mixed with each other until a substantially uniform admixture is obtained. Then about twelve and one-half pounds of said nicotine containing composition B is added thereto and the entire mass is stirred for providing a fairly uniform distribution of said nicotine containing composition B throughout said limes. Immediately thereafter the admixture is packed in air tight drums and is ready for distribution and use.

The mushroom house may be treated by spreading thin layers of Dust B on the walks and the mushroom beds and the Dust A is sprayed into the air of the house where it remains suspended for an extended period of time. The gases liberated from Dust B may rise to a height of 15 feet in a house to exterminate the deleterious animal life.

I have found that by so employing my invention in mushroom houses that are already badly attacked by deleterious animal life and its larvae further devastation of normal crop growth is stopped and I have also found that a house containing spotted mushrooms when subjected to both dusts in the manner heretofore set forth will within a week have a 75–100% increase in mushroom content.

Although my inventions have been described with particularity they are to be limited only by the prior art.

What is claimed:

1. In the method of protecting mushrooms and mushroom spawn during cultivation in beds, the steps of employing two separate dusts, each containing mineral alkali and nicotine, one dust having substantially more of said alkali per pound of active nicotine than does the other, adding the more alkaline dust to the beds and suspending the other dust in the atmosphere surrounding said beds.

2. In the method of protecting mushroom and mushroom spawn during cultivation in beds, the steps of employing two separate dusts, each containing mineral alkali and nicotine, one dust having substantially more of said alkali per pound of nicotine than does the other, spreading the more alkaline dust on the beds and charging the atmosphere surrounding the beds with said other dust.

3. In a method of protecting mushrooms and mushroom spawn during cultivation in beds, the steps of providing two separate dusts, each containing mineral alkali and nicotine, one dust having substantially more of said alkali per pound of active nicotine than the other, spreading the more alkaline dust on the beds and surfaces therebetween, and then charging the atmosphere surrounding the beds with the other dust.

VINCENT LOSITO.